(12) United States Patent
Fluri et al.

(10) Patent No.: US 10,103,523 B2
(45) Date of Patent: Oct. 16, 2018

(54) RC VOLTAGE DIVIDERS USED IN COMMON GIS GAS COMPARTMENT

(71) Applicant: SIEMENS AKTIENGESELLSCHAFT, Munich (DE)

(72) Inventors: Rolf Fluri, Basel (CH); Pascal Loeb, Saint-Louis (FR); Joachim Schmid, Efringen-Kirchen (DE); Christian Weber, Basel (CH)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/510,349

(22) PCT Filed: Jul. 15, 2015

(86) PCT No.: PCT/EP2015/066166
§ 371 (c)(1),
(2) Date: Mar. 10, 2017

(87) PCT Pub. No.: WO2016/037742
PCT Pub. Date: Mar. 17, 2016

(65) Prior Publication Data
US 2017/0256924 A1    Sep. 7, 2017

(30) Foreign Application Priority Data
Sep. 10, 2014    (EP) .................................... 14184299

(51) Int. Cl.
*H02B 13/035*    (2006.01)
*H01H 33/56*    (2006.01)
(Continued)

(52) U.S. Cl.
CPC ........... *H02B 13/035* (2013.01); *H01H 11/00* (2013.01); *H01H 33/55* (2013.01); *H01H 33/56* (2013.01); *H01H 33/59* (2013.01)

(58) Field of Classification Search
CPC ...... H02B 13/035; H01H 11/00; H01H 33/55; H01H 33/56; H01H 33/59; H01H 33/14;
(Continued)

(56) References Cited

U.S. PATENT DOCUMENTS 3,886,441 A * 5/1975 Kranz ..................... F02P 17/08
                                                              324/126
4,034,283 A * 7/1977 Pellegrino .............. G01R 15/06
                                                              323/370
(Continued)

FOREIGN PATENT DOCUMENTS

FR        2328968 A1    5/1977
FR        2651889 A1    3/1991
(Continued)

*Primary Examiner* — Renee S Luebke
*Assistant Examiner* — William Bolton
(74) *Attorney, Agent, or Firm* — Laurence Greenberg; Werner Stemer; Ralph Locher

(57) ABSTRACT

An arrangement includes a gas insulated switchgear and a RC voltage divider. The gas insulated switchgear includes a switchgear compartment and a voltage divider compartment. The RC voltage divider and the gas insulated switchgear together at least partially form a hermetically sealed common gas compartment. A method for assembling the arrangement is also provided.

10 Claims, 3 Drawing Sheets

(51) Int. Cl.
*H01H 33/55* (2006.01)
*H01H 33/59* (2006.01)
*H01H 11/00* (2006.01)

(58) Field of Classification Search
CPC .............. H01H 33/143; H01H 33/16; H01H 2033/146; G01R 15/04; G01R 15/06
USPC .................... 218/145, 143, 144, 144 AP
See application file for complete search history.

(56) References Cited

U.S. PATENT DOCUMENTS

| | | | | | |
|---|---|---|---|---|---|
| 4,434,332 | A | * | 2/1984 | Yanabu | H01H 33/143 218/144 |
| 5,039,831 | A | * | 8/1991 | Sato | H01H 33/16 218/144 |
| 5,235,147 | A | * | 8/1993 | Pham | H01H 33/16 218/144 |
| 6,091,039 | A | * | 7/2000 | Pham | H02B 13/0356 218/145 |
| 7,079,004 | B2 | * | 7/2006 | Budak | G01R 15/06 338/48 |
| 2003/0193325 | A1 | | 10/2003 | Koziel | |

FOREIGN PATENT DOCUMENTS

| | | | |
|---|---|---|---|
| JP | S5346060 | A | 4/1978 |
| JP | S5575654 | A | 6/1980 |

\* cited by examiner

RC VOLTAGE DIVIDERS USED IN COMMON GIS GAS COMPARTMENT

BACKGROUND OF THE INVENTION

Field of the Invention

The invention relates to the technical field of arrangements for a gas insulated switchgear (GIS) and a RC voltage divider.

To use a RC Voltage Divider in a common GIS gas compartment either the elimination of the resin barrier of the RC voltage divider (closed support insulator) or the use of an open support insulator is necessary.

In order to deliver a pretested conventional gas insulated instrument transformer to the GIS manufacturer or on site, the active part must be assembled in a sealed and treated gas environment. Therefore all existing GIS instrument transformers need to be built in an own hermetical sealed and tested gas compartment.

SUMMARY OF THE INVENTION

It is the objective of the present invention to simplify assembling and to reduce the overall cost of an arrangement that comprises a gas insulated switchgear and a RC voltage divider.

This objective is solved by the measures taken in accordance with the independent claims. Further advantageous embodiments are proposed by the independent claims.

According to an aspect, an arrangement comprising a gas insulated switchgear and an RC voltage divider is disclosed. The gas insulated switchgear comprises a switchgear compartment and a voltage divider compartment. The RC voltage divider and the gas insulated switchgear form together at least partially a hermetically sealed common gas compartment.

According to a further aspect, a method for assembling an arrangement including a gas insulated switchgear and a RC voltage divider is disclosed. The gas insulated switchgear comprises a switchgear compartment. In a method step, a RC voltage divider that does not comprise a hermetically sealed outer RC divider housing and/or that does not comprise a resin barrier adjacent a high voltage connection terminal of the RC voltage divider is provided. In a further method step the RC voltage divider is tested. Then the RC voltage divider is mounted to the gas insulated switchgear, such that a gas insulated switchgear housing of the gas insulated switchgear and a terminal cover plate of the RC voltage divider form together at least partially a hermetically sealed common gas compartment.

BRIEF DESCRIPTION OF THE SEVERAL VIEWS OF THE DRAWING

In the following the invention is described on the basis of embodiments illustrated by the figures.

DESCRIPTION OF THE INVENTION

Figure 1:
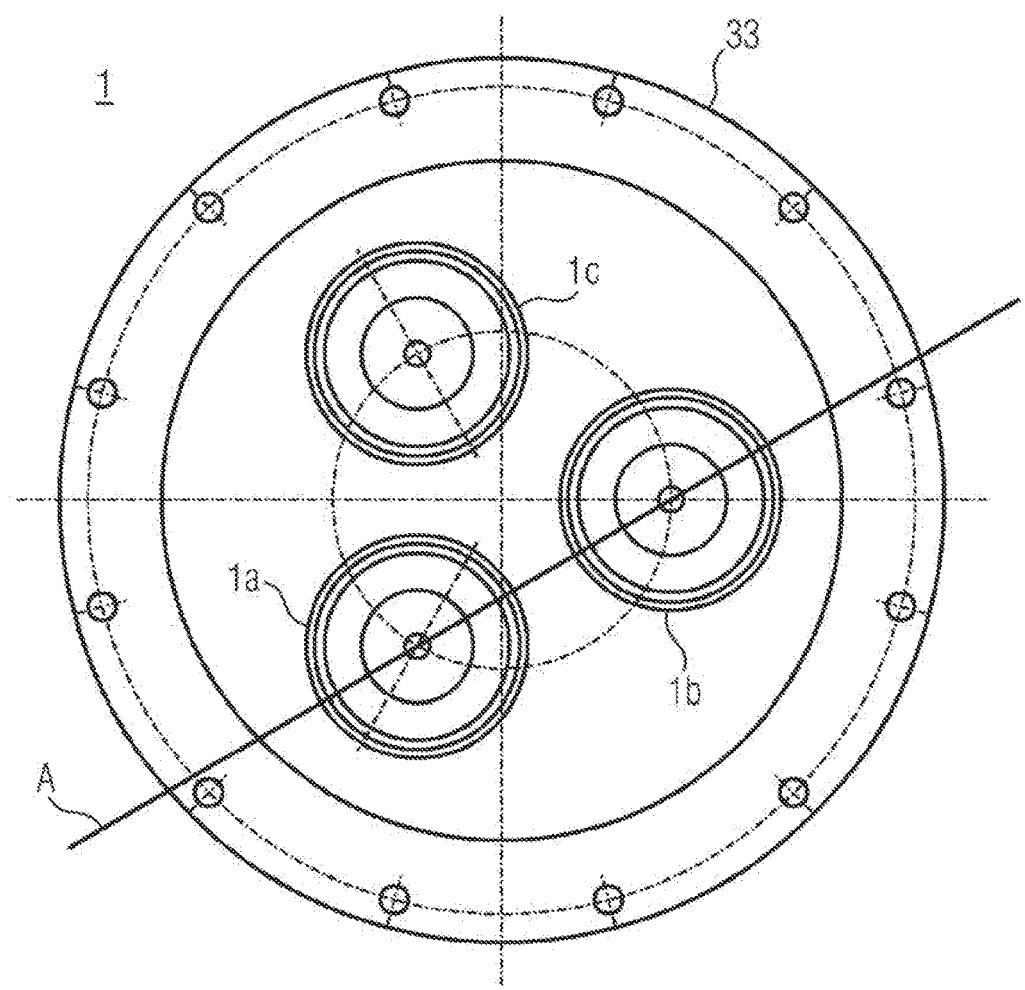
FIG. 1 shows a top view scheme of a three phase RC voltage divider that can be used in an embodiment of the invention.

FIG. 1 shows a top view of a three phase voltage divider 1, including three single phase voltage dividers 1a, 1b, 1c, and terminal cover plate 33.

Figure 2:
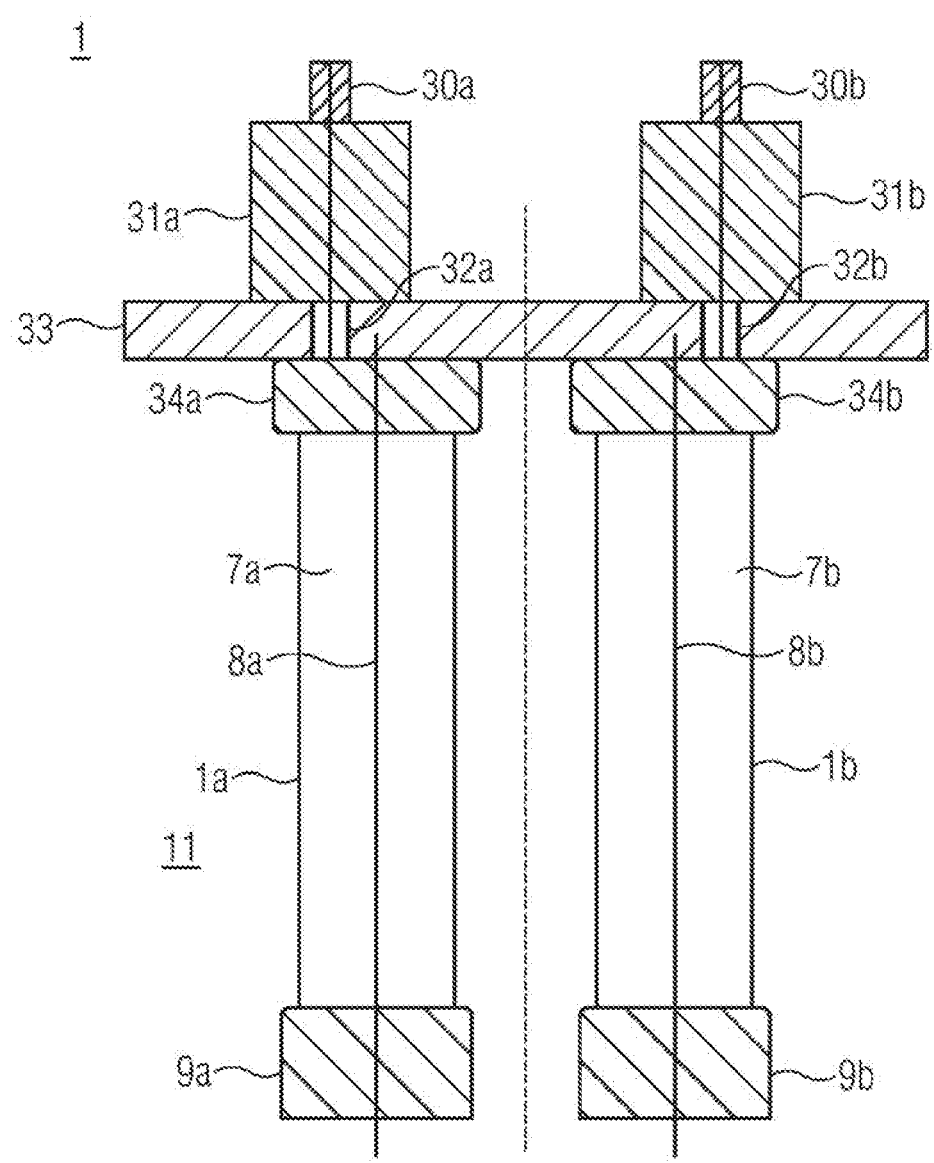
FIG. 2 shows a side view cut scheme of the three phase RC voltage divider of FIG. 1.

FIG. 2 shows a side view cut scheme of the three phase RC voltage divider 1 of FIG. 1 along the plane A. The three phase RC voltage divider 1 comprises a terminal cover plate 33, and three single phase RC voltage dividers 1a, 1b, 1c. In FIG. 2, only reference signs 1a, 1b are visible. For the sake of better understanding, the reference signs relating to the third single phase voltage divider 1c are also included in the following description. Each of the single phase RC voltage dividers 1a, 1b, 1c comprises a high voltage connection terminal 9a, 9b, 9c, an active part 8a, 8b, 8c, an inner compartment 7a, 7b, 7c, a connection flange 34a, 34b, 34c for ground connection, a secondary adjusting housing 31a, 31b, 31c, a bushing 32a, 32b, 32c between the active part 8a, 8b, 8c and the secondary adjusting housing 31a, 31b, 31c, and a secondary signal cable 30a, 30b, 30c. The RC voltage divider 1 does not comprise a resin barrier at the high voltage connection terminals 9a, 9b, 9c.

According to an embodiment, the RC voltage divider of FIG. 1 is provided and tested, for example at the site of the RC voltage divider manufacturer. The RC voltage divider 1 is then transported to a gas insulated switchgear 3, for example at the premises of an electric power supplier. There the RC voltage divider 1 is mounted to the gas insulated switchgear 3, such that the terminal cover plate 33 of the voltage divider 1 and the a outer RC divider housing 19a, being part of a switchgear housing 19 or being mounted to a switchgear housing 19, are forming together a hermetically sealed common gas compartment 5. Then an insulating gas, for example SF6, is filled into the common gas compartment 5. This way no resin barrier needs to be provided, and an embodiment of the arrangement 10 of FIG. 3 can be assembled more easily and overall cost can be reduced.

Figure 3:
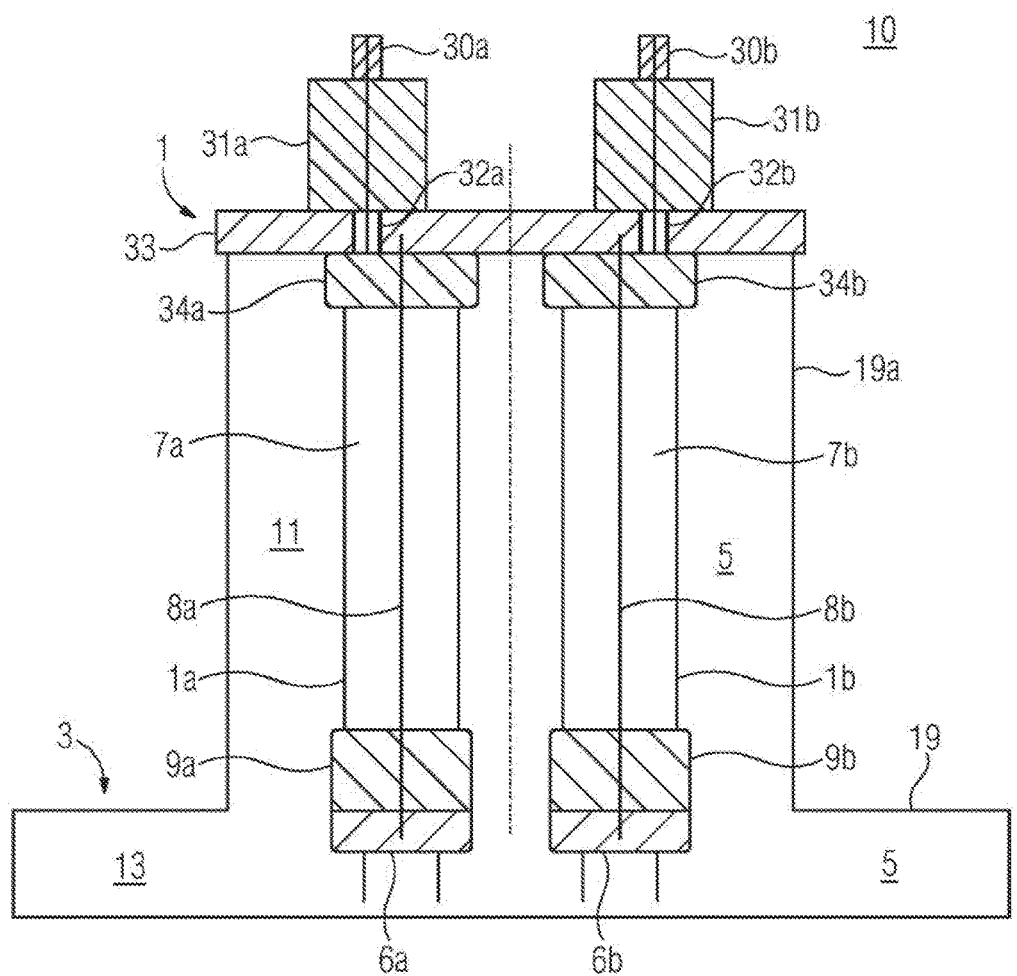
FIG. 3 shows an assembly according to an embodiment of the invention.

FIG. 3 shows the components of the three phase RC voltage divider 1 of FIGS. 1 and 2 mounted together with the outer RC divider housing 19a being part of the switchgear housing 19 or being mounted to the switchgear housing 19. According to this embodiment, the RC voltage divider 1 is thus for example first provided without any outer RC divider housing 19a, e.g. at the premises of the voltage divider manufacturer. Only later, when the entire arrangement 10 is assembled, e.g. at a gas insulated switchgear site, the terminal cover plate 33 of the RC voltage divider 1 is mounted to the outer RC divider housing 19a of the gas insulated switchgear 3 in order to provide a common gas compartment 5. The high voltage connection terminals 9a, 9b, 9c of the RC voltage divider 1 are connected to GIS side connection terminals 6a, 6b, 6c of the GIS 3.

The arrangement 10 comprises the gas insulated switchgear 3 and the RC voltage divider 1. The gas insulated switchgear 3 comprises a switchgear compartment 13, and the gas insulated switchgear housing 19, the RC voltage divider 1, and the voltage divider compartment 11. The RC voltage divider 1 and the gas insulated switchgear housing 19, including the outer RC divider housing 19a, form together at least partially a hermetically sealed common gas compartment 5, such that gas within the common gas compartment 5 is allowed to be exchanged between the RC voltage divider 1 and the common gas compartment 5 of the gas insulated switchgear 10. In other words, the GIS 3 and the RC voltage divider 1 are not hermetically sealed against each other.

In the embodiments described on the basis of the figures, the single phase voltage dividers 1a, 1b, 1c each comprise a hermetically sealed inner compartment 7a, 7b, 7c filled with insulating oil or gas, and enclosing an active part of the respective single phase RC voltage divider 1a, 1b, 1c, such that the inner compartments are hermetically sealed. This allows to test each single phase voltage divider 1a, 1b, 1c, and to transport them as a pretested three phase RC voltage divider 1 to the site of the GIS, without a need to redo all tests at said site.

The embodiments described on the basis of FIG. 3 show an arrangement where the three phase RC voltage divider 1 comprises three phases within one outer RC divider housing 19a being part of the gas insulated switchgear housing 19. Of course, also another number of single phase voltage dividers can be packed into the outer RC divider housing 19a. Particularly for very large voltages to be applied, in order to strongly insulate the phases from each other, it is advantageous to pack every single phase voltage divider into a separate outer RC divider housing.

In order to reduce overall costs of the GIS the requirement for an embodiment with just a pure RC Voltage Divider without separate SF6 filled housing including standard SF6-equipment (like pressure control systems, burst pressure devices, humidity control systems and filling valves) came up.

According to an embodiment, the elimination of the resin barrier (closed support insulator) or the use of an open support insulator leads to the requirement for an encapsulated built up of the active part of the instrument transformers. The active parts of the RC Voltage Dividers are hermetical sealed in small FRP-tubes and therefore encapsulated from the GIS gas compartment.

An advantage of an embodiment of the invention is the elimination of the support insulator. Another advantage is the simplifying of the overall housing of the GIS (cost reduction) by eliminating standard SF6-equipment (pressure control systems, burst pressure devices, humidity control systems and filling valves). Reduction of cost of the GIS is given by the possibility that the RC Voltage Divider can be delivered directly to the GIS-manufacturer without an outer hermetically sealed housing which includes also a support insulator and a transport cover for the support insulator. At GIS-manufacturer the RC Voltage Divider will be assembled directly to the housing of the GIS and finally tested together with the whole GIS.

The pretesting, storing and shipping of the size reduced RC Voltage Dividers are simplified and therefore additional cost and time reduction results.

The invention claimed is:

1. An arrangement, comprising:
   a gas insulated switchgear and a RC voltage divider;
   said gas insulated switchgear including a switchgear compartment and a voltage divider compartment;
   said RC voltage divider and said gas insulated switchgear together at least partially forming a hermetically sealed common gas compartment; and
   said RC voltage divider including an inner compartment being hermetically sealed against said voltage divider compartment, and said inner compartment including an active part of said RC voltage divider.

2. The arrangement according to claim 1, wherein said voltage divider compartment and said switchgear compartment are not hermetically separated by a resin barrier.

3. The arrangement according to claim 1, wherein said RC voltage divider includes one phase or three phases.

4. The arrangement according to claim 1, wherein said inner compartment is filled with an insulating oil or an insulating gas.

5. The arrangement according to claim 1, wherein said common gas compartment is filled with an insulating gas.

6. A method for assembling an arrangement including a RC voltage divider and a gas insulated switchgear including a switchgear compartment, the method comprising the following steps:
   a) providing a RC voltage divider not having at least one of a hermetically sealed outer RC divider housing or a resin barrier adjacent a high voltage connection terminal of the RC voltage divider, and providing the RC voltage divider with a hermetically sealed inner compartment enclosing an active part of the RC voltage divider;
   b) testing the RC voltage divider; and
   c) mounting the RC voltage divider to the gas insulated switchgear and causing a gas insulated switchgear housing and a terminal cover plate of the RC voltage divider to at least partially together form a hermetically sealed common gas compartment.

7. The method according to claim 6, wherein:
   step a) includes providing the RC voltage divider without a divider compartment; and
   step c) includes mounting an outer RC divider housing to the gas insulated switchgear to provide the divider compartment.

8. The method according to claim 6, wherein the RC voltage divider includes one phase or three phases.

9. The method according to claim 6, wherein step a) of providing the RC voltage divider includes filling the inner compartment with an insulating oil or an insulating gas.

10. The method according to claim 6, wherein step c) includes filling an insulating gas into the common gas compartment.

* * * * *